United States Patent [19]  [11] 3,937,074
Burkett  [45] Feb. 10, 1976

[54] APPARATUS FOR CHECKING INTEGRITY OF MAGNET VALVES IN ELECTRO-PNEUMATIC BRAKE SYSTEMS

[75] Inventor: Richard O. Burkett, Apollo, Pa.
[73] Assignee: Westinghouse Air Brake Company, Wilmerding, Pa.
[22] Filed: Aug. 26, 1974
[21] Appl. No.: 500,412

[52] U.S. Cl. .................................................. 73/121
[51] Int. Cl.² ............................................... G01L 5/28
[58] Field of Search .................................. 73/121, 39

[56] References Cited
UNITED STATES PATENTS
584,463   6/1897   Creelman ........................... 317/154

Primary Examiner—James J. Gill
Assistant Examiner—Anthony V. Ciarlante
Attorney, Agent, or Firm—R. W. McIntire, Jr.

[57] ABSTRACT

Integrity checking apparatus including an indicator lamp on each car of a transit train equipped with electropneumatically controlled brakes, said lamp being illuminated when the application magnet valve operates to effect a brake application and remaining illuminated until a stick circuit, which is closed by the brake application operation to keep said lamp illuminated, is interrupted by operation of the release magnet valve in releasing the brakes, thus providing a positive means of monitoring the integrity of both the application and release magnet valves during a terminal test of the brake system.

7 Claims, 2 Drawing Figures

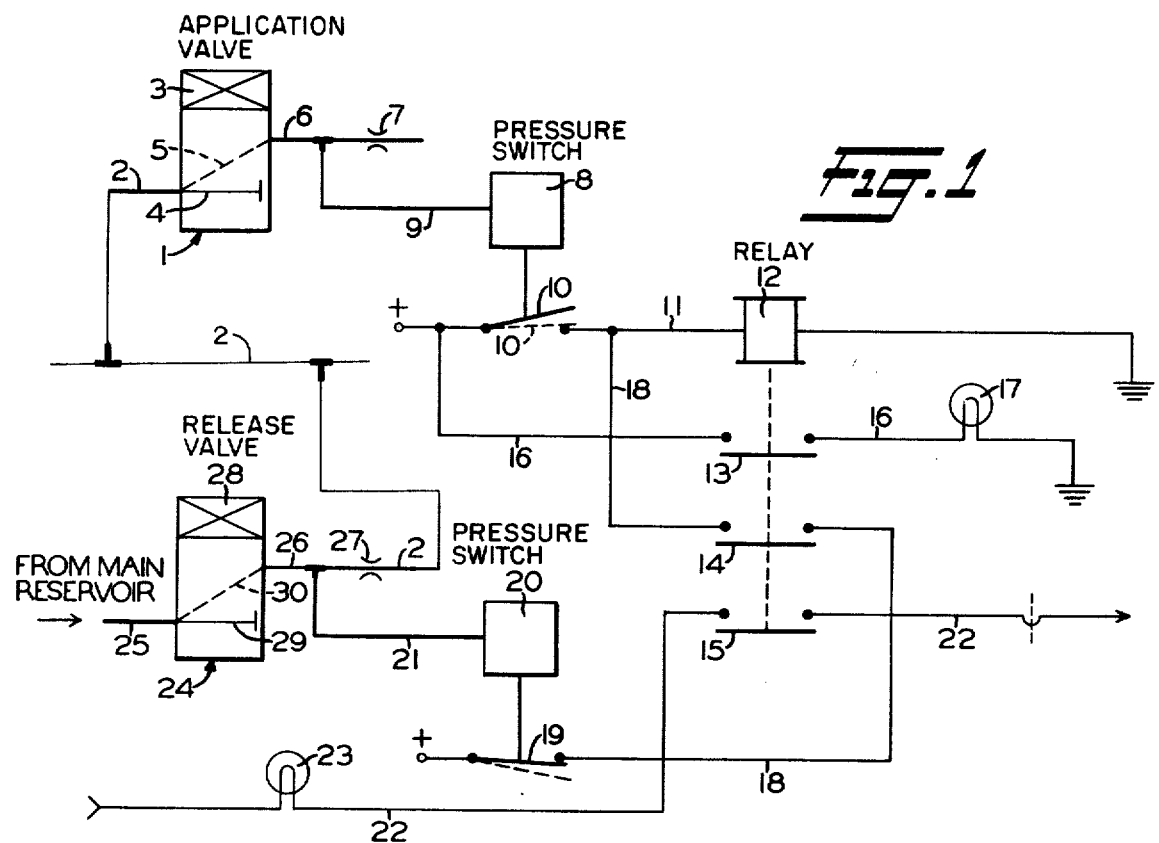
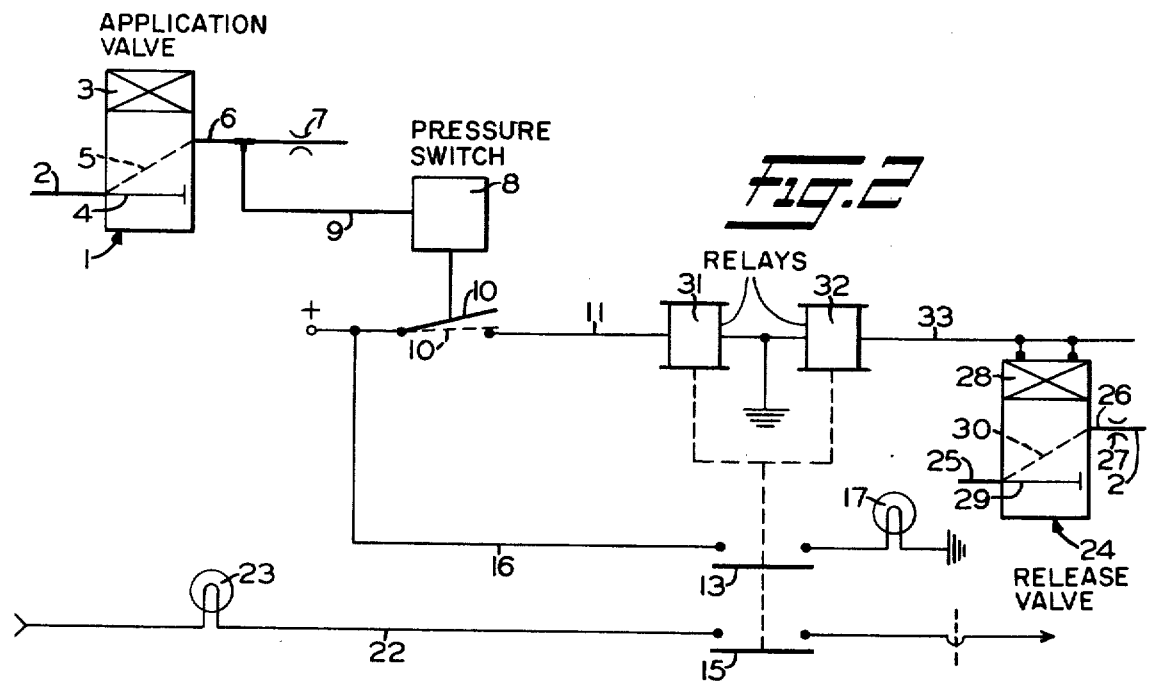

APPARATUS FOR CHECKING INTEGRITY OF MAGNET VALVES IN ELECTRO-PNEUMATIC BRAKE SYSTEMS

BACKGROUND OF THE INVENTION

Rapid transit type trains are commonly equipped with conventional electro-pneumatic brake equipment, the electrical portion of the brake system being employed as the primary control of the brakes because of the near instantaneous response obtainable at each car simultaneously, whereas the pneumatic portion is provided for back-up control and operates automatically in the event a malfunction of the electrical portion occurs. With such an arrangement, therefore, when a terminal test is made, the fact that the brakes on the train apply and release is no positive indication that the electrical portion of the system is functioning, because the pneumatic portion assures such application and release notwithstanding failure of the electrical portion.

SUMMARY OF THE INVENTION

The object of the present invention, therefore, is to provide a simplified, low-cost means for obtaining a positive indication of the integrity of both the application and release magnet valves of the electrical portion of an electro-pneumatic brake system.

Briefly, the invention comprises a first, normally open pressure switch operated to a closed position by a pressure differential established across an application choke via which brake pipe pressure is vented when an application magnet valve device is energized by the operator. Closing of the first pressure switch causes energization of a relay which closes a circuit in which an indicator lamp is interposed, thereby illuminating the lamp. At the same time the relay also picks up a stick circuit connected to a second, normally closed pressure switch for keeping the lamp illuminated, notwithstanding equalization of pressure across the application choke, until said second pressure switch is operated to an open position, in which the stick is interrupted and the lamp extinguished, by establishment of a pressure differential across a release choke when a release magnet valve device is energized to connect main reservoir pressure to the brake pipe via said release choke. The integrity of both the application and release magnet valves is thus determined.

A modified version of the invention provides for checking the integrity of the application magnet valve and the continuity of the trainline application and release wires only. An application coil of a dual winding relay is mechanically latched in an energized position for illuminating the lamp when the application magnet valve is energized. The lamp remains illuminated until a brake release is effected, whereby the release wire energizes a release coil of the dual relay to cause the mechanical latch of the relay to be released and thereby interrupt the lamp circuit. In the drawing, FIG. 1 is a schematic view of a system for checking the integrity of both application and release magnet valves in an electro-pneumatic brake system; and FIG. 2 is a schematic view of a modified system for checking the integrity of the application magnet valve and the trainwire release circuit.

DESCRIPTION AND OPERATION

As shown in FIG. 1, the integrity checking system comprises an application magnet valve device 1 connected to a brake pipe 2 and including a solenoid portion 3 which, when energized under the train engineer's control, effects operation of said valve device from a normally closed position represented by a solid line 4, to an open position represented by a broken line 5. In the open position 5 of valve device 1, brake pipe 2 is vented to atmosphere via a pipe 6 and a choke 7 interposed therein.

The integrity checking system further comprises a pressure switch 8 connected via a pipe 9 to pipe 6 on the upstream side of choke 7. Pressure switch 8 includes a switch element 10 connected serially in a relay circuit comprising a conductor 11 in which a relay device 12 is also serially connected. Switch 8 normally occupies an open position, in which switch element is open, as shown in FIG. 1, and operates in conventional manner in response to fluid pressure acting therein to a closed position in which switch element 10 is moved to a closed position shown in broken outline in the drawing.

Relay device 12 controls three switch members 13, 14, and 15, all of which occupy respective open positions when relay 12 is deenergized.

Switch member 13 is serially interposed in an indicator lamp circuit comprising a conductor 16 in which an indicator lamp 17 is also serially connected. Switch member 14 is serially connected in a holding or stick circuit comprising a conductor 18 connected to conductor 11 and having also serially connected therein a switch element 19 of a pressure switch device 20. Switch member 15 is serially connected in a trainwire circuit comprising a conductor 22 having an indicator lamp 23 serially connected therein and extending throughout the train, said lamp being located in the engineer's cab for a purpose to be hereinafter disclosed.

Operation of pressure switch 20 is controlled by a release magnet valve device 24 connected on the inlet side to the main reservoir (not shown) of the brake system via a pipe 25. The outlet side of release magnet valve device 24 is connected via a pipe 26 and a choke 27, in series, to brake pipe 2. Pipe 21 has one end connected to pressure switch device 20 and its other end connected to pipe 26 on the upstream side of choke 27. Release magnet valve device 24 includes a solenoid portion 28 which, when energized under the engineer's control, effects operation of the valve device from a normally closed position represented by a solid line 29, to an open position represented by a broken line 30. In the open position of valve device 24, pipe 25 from the main reservoir is communicated with brake pipe 2 via pipe 26 and choke 27, whereas in the closed position of the valve device, said communication is cut off.

When it is desired to conduct an integrity checking test while the train is standing still, or a terminal test, the engineer operates his brake valve (not shown) to initiate a brake application which effects energization of solenoid 3 of application magnet valve 1, said valve thus being operated from its closed position 4 to its open position 5. As is well known to those skilled in the art, in order to effect a brake application with the automatic type brake system, pressure in the brake pipe must be reduced according to the nature of the application desired. Thus, when application magnet valve device 1 is operated to its open position 5, brake pipe 2 is communicated to atmosphere via pipe 6.

Due to the restrictive action of choke 7, however, a sufficient pressure differential is established thereacross so that such fluid pressure is transmitted via pipe 9 to pressure switch 8 which, in response thereto, causes switch element 10 to be operated to its closed position, thereby closing the energizing circuit for relay 12. With relay 12 energized, all switch members 13, 14, and 15 are operated to respective closed positions. The circuit for indicator lamp 17 is thus completed, and said lamp is illuminated which indicates that application magnet valve device 1 is operating properly.

Closing of switch member 14 completes the stick circuit comprising conductor 18 and normally closed switch element 19 for maintaining, for the time being, relay 12 energized and, therefore, lamp 17 illuminated, notwithstanding that the pressure across choke 7 eventually equalizes with the reduced pressure in brake pipe 2, which would be insufficient for holding pressure switch 8 and switch element 10 in a closed position. Hence, with the stick circuit closed, relay 12 is maintained in an energized state until switch element 19 is operated to an open position in which the stick circuit is opened, as will presently be described.

As is also well known to those skilled in the art, in order to effect a release of the brake application in an automatic brake system, the brake pipe must be recharged with fluid pressure. Thus, when the engineer effects energization of solenoid 28 of release magnet valve device 24, the valve is operated to its open position 30 to connect pressure from the main reservoir (not shown) to brake pipe 2 via pipes 25 and 26, and choke 27. The pressure differential thus established across choke 27 is transmitted via pipe 21 to pressure switch 20 which, in response thereto, causes switch element 19 to be operated to its open position, thereby interrupting the stick circuit for relay 12. Relay 12 is deenergized so that all switch members 13, 14, and 15 are restored to their respective open positions. With switch member 13 in its open position, the lamp circuit is opened and indicator lamp 17 is extinguished, which thereby indicates that release magnet valve device 24 is also operating properly.

The trainwire circuit comprising conductor 22 with switch member 15 and indicator lamp 23 serially connected therein, provides means for checking the integrity of all the application magnet valve devices of the train at one location, that is, in the engineer's cab, rather than checking each indicator lamp 17 on each car. When a brake application is initiated, if the respective application magnet valves 1 on all the cars are operating properly, all the respective switch members 15 will close to complete the trainwire circuit and thereby illuminate lamp 23 in the engineer's cab, thus indicating the integrity of all said application magnet valve devices. If lamp 23 in the engineer's cab is not illuminated, then a further check by a crewman of the indicator lamps 17 on each car must be carried to locate the trouble spot. In the application function of the brake system, it is important that the application magnet valve devices 1 on all the cars are functioning properly, otherwise, as is well known to those skilled in the art, a malfunction of brake application on one or more cars can result in a serious deterioration of train retardation. Thus, indicator lamp 23 in the engineer's cab is of great importance to him when the train is moving because failure of said indicator lamp to illuminate when he initiates a brake application, indicates a malfunction of one or more of the application valve devices 1. Of course, when a release of the application is initiated by effecting energization of the release magnet valve devices 24, switch elements 19 are opened, as above explained, and the stick circuits are thus interrupted to cause deenergization of relays 12 and consequent opening of switch members 15 and interruption of the lamp circuit for indicator lamp 23 which is, therefore, extinguished. Obviously, extinguishment of indicator lamp 23 does not necessarily indicate that all the release magnet valve devices 24 are functioning properly, because even if at the worst only one of the release magnet valves functions properly and only one switch element 19 and one switch member 15 are opened, the circuit for indicator lamp 23 will be interrupted anyway to cause said lamp to be extinguished. In all probability only one or two of the release magnet valve devices 24 may malfunction, in which case the situation would not be critical. As was noted above, the function of the release magnet valve device is to effect recharging of brake pipe 2 by communicating said brake pipe with the main reservoir. But since brake pipe 2 is a continuous pipe line extending throughout the train, any lack of recharging on one or two cars can be made up by the other release valve devices in charging the brake pipe on the other cars. In the event that there is a critical number of release magnet valve devices 24 malfunctioning, this will be indicated to the engineer who observes the rate of charging of brake pipe 2 on a guage (not shown) in his cab. If the rate of recharging of brake pipe 2 is below an acceptable level, the matter will be further investigated by a check of the indicator lamps 17 on the individual cars.

The purpose of the modified integrity checking system shown in FIG. 2 is to provide means for checking the integrity of the application magnet valve devices 1 and the continuity of the trainline application and release wires.

The system shown in FIG. 2 is provided with a dual relay device instead of the single relay 12, said dual relay device comprising an application coil 31 and a release coil 32. Also, instead of the stick circuit 11, 18, 14, and 19, as shown in FIG. 1, the application coil 31 is provided with well-known latching means (not shown) which is operative for latching said coil in a switch-closing or actuated position, in which switch members 13 and 15 are operated to respective closed positions upon energization of said application coil in a manner similar to that discussed above in connection with relay 12 of FIG. 1. The circuit for indicator lamp 17 thus remains closed until the latching means in application coil 31 is released.

Release coil 32 is interposed in a trainline release wire 33 to which release magnet valve device 24 is also connected in parallel relation to said release coil, said release coil being effective, when energized via said release wire at the time the engineer effects a brake release, for unlatching the latching means of application coil 31 and causing switch members 13 and 15 to be restored to their respective open positions, whereupon both indicator lamps 17 and 23 are extinguished. The respective purposes of the indicator lamps 17 and 23 in the system shown in FIG. 2 are similar to those eiscussed above in connection with checking the integrity of the application magnet valve devices 1. However, in the event that any one of the indicator lamps 17 fails to be extinguished when a brake release is initiated, such failure indicates that the respective release coil 32 has not been energized to cause release of the latching means of the respective application coil 31, and thereby indicates a defect in the continuity of release wire 33.

Having now described the invention what I claim as new and desire to secure by Letters Patent, is:

1. Testing apparatus for checking the integrity of the electrical portion of an electro-pneumatic brake system for a railway train vehicle, the pneumatic portion of which comprises a brake pipe from which fluid pressure is released for effecting a brake application and to which fluid pressure is supplied for releasing the application, and the electrical portion of which comprises an application magnet valve device effective, when energized, for venting the brake pipe to atmosphere and, when deenergized for cutting off such venting, and a release magnet valve device effective, when energized, for causing recharging of said brake pipe with fluid pressure and, when deenergized, for cutting off such recharging, and a trainline release wire, said testing apparatus comprising:
   a. means responsive to energization of the application magnet valve device for providing a continuous signal indicating energization of the application magnet valve device; and
   b. means responsive to energization of the release magnet valve device for terminating said signal.

2. Testing appparatus, as set forth in claim 1, wherein said indicator means comprises:
   a. a first indicator circuit including a first indicator lamp connected serially therein for providing said signal when said first indicator circuit is energized; and
   b. an energizing circuit having a relay and a first pressure switch connected serially therein, said relay controlling energization and deenergization of said first indicator circuit, and said first pressure switch being connectable pneumatically to the application magnet valve device and operable from a normally open position, in response to fluid pressure vented from the brake pipe, to a closed position for effecting energization of said relay and consequent energization of said first indicator circuit.

3. Testing apparatus, as set forth in claim 2, wherein said indicator means comprises:
   a. a second indicator circuit extending serially from car to car throughout the train;
   b. a second indicator lamp interposed in said second indicator circuit at a convenient observation location; and
   c. respective normally open switch members interposed serially in said second indicator circuit on each car of the train, said switch members being operable to respective closed positions responsively to energization of the respective relays on each car for causing illumination of said second indicator lamp when all said switch members are closed.

4. Testing apparatus, as set forth in claim 2, wherein said first indicator circuit further comprises a normally open switch member connected serially in said first indicator circuit and operable to a closed position responsively to energization and operation of the relay to an actuated position.

5. Testing apparatus, as set forth in claim 2, wherein said terminating means comprises:
   a. a holding circuit connected serially to said relay and including:
      i. a normally closed second pressure switch connectable pneumatically to said release magnet valve device and connected serially in said holding circuit,
      ii. a normally open switch member connected serially in said holding circuit and operable responsively to energization of said relay to a closed position for closing said holding circuit and maintaining said relay energized notwithstanding restoration of said first pressure switch to its said open position,
      iii. said second pressure switch being operable responsively to fluid pressure supplied to the brake pipe during charging thereof to an open position in which said holding circuit is interrupted and said relay is consequently deenergized to cause said first indicator circuit to be interrupted.

6. Testing apparatus, as set forth in claim 5, further characterized by:
   a. a first choke interposed in a first pipe connectable to the application magnet valve device and via which fluid pressure is vented from the brake pipe, said first pressure switch being pneumatically connected to said first pipe on the upstream side of said first choke and being operable to its said closed position responsively to pressure differential established across said first choke for a predetermined time interval;
   b. a second choke interposed in a second pipe connectable to the release magnet valve device and via which fluid pressure is supplied to the brake pipe during charging thereof, said second pressure switch being pneumatically connected to said second pipe on the upstream side of said second choke and being operable to its said open position responsively to pressure differential established across said second choke.

7. Testing apparatus, as set forth in claim 4, wherein said relay is characterized by self-latching means for holding the relay in its said actuated position, and said terminating means comprises:
   a. a trainline release circuit extending serially from car to car throughout the train; and
   b. respective release relays interposed serially in said release circuit on each car of the train and in parallel relation to the respective release magnet valve devices, said release relays being energizable upon energization of the release magnet valve devices for effecting release of said self-latching means.

* * * * *